US009867066B2

(12) United States Patent
Iwai

(10) Patent No.: US 9,867,066 B2
(45) Date of Patent: *Jan. 9, 2018

(54) MOBILE COMMUNICATION SYSTEM, DETECTION SERVER, CONTROL APPARATUS, MOBILE COMMUNICATION APPARATUS, NETWORK OPTIMIZING METHOD, AND NON-TRANSITORY COMPUTER READABLE MEDIUM HAVING PROGRAM STORED THEREON

(71) Applicant: NEC Corporation, Tokyo (JP)

(72) Inventor: Takanori Iwai, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/373,408

(22) Filed: Dec. 8, 2016

(65) Prior Publication Data
US 2017/0094536 A1  Mar. 30, 2017

Related U.S. Application Data

(63) Continuation of application No. 14/372,325, filed as application No. PCT/JP2012/007339 on Nov. 15, 2012.

(30) Foreign Application Priority Data

Jan. 16, 2012 (JP) ................................ 2012-006345

(51) Int. Cl.
H04W 4/18 (2009.01)
H04W 24/02 (2009.01)
(Continued)

(52) U.S. Cl.
CPC ............. *H04W 24/02* (2013.01); *H04B 7/26* (2013.01); *H04W 40/005* (2013.01);
(Continued)

(58) Field of Classification Search
CPC ... H04W 4/18; H04W 88/02; H04W 52/0254; H04W 4/025; H04W 36/32; H04W 48/08;
(Continued)

(56) References Cited

U.S. PATENT DOCUMENTS 5,675,629 A   10/1997 Raffel et al.
6,611,197 B1   8/2003 Ayerst et al.
(Continued)

FOREIGN PATENT DOCUMENTS

JP    2006-279679      10/2006
WO   WO 2008/130013 A1   10/2008

OTHER PUBLICATIONS

Extended European Search Report dated Oct. 1, 2015 by the European Patent Office in counterpart European Patent Application No. 12865814.3.
(Continued)

*Primary Examiner* — Keith Ferguson
(74) *Attorney, Agent, or Firm* — Finnegan, Henderson, Farabow, Garrett & Dunner, L.L.P.

(57) ABSTRACT

An object of the present invention is to provide a mobile communication system, a detection server, a control apparatus, a mobile communication apparatus, a network optimizing method, and a program which can execute optimization of network processing based on a change of use characteristics. A mobile communication system according to the present invention includes: a detection server that detects a characteristics change of a mobile communication apparatus based on an event notice transmitted from the mobile communication apparatus; and a control apparatus that determines control contents related to the mobile communication apparatus based on the characteristics change of the mobile communication apparatus detected by the detection server, and sets the determined control contents to a
(Continued)

processing node that executes data transfer processing between the mobile communication apparatus and another mobile communication apparatus or control processing related to the data transfer processing.

35 Claims, 19 Drawing Sheets

(51) Int. Cl.
<table>
<tr><td>H04B 7/26</td><td>(2006.01)</td></tr>
<tr><td>H04W 40/00</td><td>(2009.01)</td></tr>
<tr><td>H04W 64/00</td><td>(2009.01)</td></tr>
<tr><td>H04W 76/02</td><td>(2009.01)</td></tr>
<tr><td>G08G 1/01</td><td>(2006.01)</td></tr>
</table>

(52) U.S. Cl.
CPC .......... *H04W 64/00* (2013.01); *H04W 76/02* (2013.01); *G08G 1/0112* (2013.01)

(58) Field of Classification Search
CPC .. H04W 52/0258; H04W 48/04; H04W 52/28
USPC ...... 455/517, 550.1, 569.2, 569.1, 445, 509, 455/404.1, 404.2, 405, 410, 412.1, 412.2, 455/414.1–414.4, 422.1, 403, 419–420, 455/421, 456.1–457, 450, 575.1, 575, 455/426.1, 426.2, 560, 561; 370/310, 370/328, 329, 338, 313
See application file for complete search history.

(56) References Cited

U.S. PATENT DOCUMENTS

<table>
<tr><td>2006/0187847 A1</td><td>8/2006</td><td>Pelton et al.</td></tr>
<tr><td>2007/0021155 A1*</td><td>1/2007</td><td>Yu ..................... H04W 52/0216<br>455/574</td></tr>
<tr><td>2007/0087767 A1*</td><td>4/2007</td><td>Pareek .................. H04W 68/00<br>455/502</td></tr>
<tr><td>2007/0202895 A1*</td><td>8/2007</td><td>Benco ................ H04W 76/027<br>455/466</td></tr>
<tr><td>2008/0119209 A1</td><td>5/2008</td><td>Upp</td></tr>
<tr><td>2008/0220782 A1</td><td>9/2008</td><td>Wang et al.</td></tr>
<tr><td>2009/0085728 A1</td><td>4/2009</td><td>Catten et al.</td></tr>
<tr><td>2009/0143065 A1</td><td>6/2009</td><td>Mattila</td></tr>
<tr><td>2010/0081455 A1</td><td>4/2010</td><td>Teasdale et al.</td></tr>
<tr><td>2012/0040650 A1</td><td>2/2012</td><td>Rosen</td></tr>
<tr><td>2012/0063464 A1*</td><td>3/2012</td><td>Mehta ................... H04W 28/02<br>370/401</td></tr>
<tr><td>2013/0070669 A1*</td><td>3/2013</td><td>Haynes ................... H04W 8/24<br>370/328</td></tr>
</table>

OTHER PUBLICATIONS

3GPP TS 22.368 V11.3.0, 3$^{rd}$ Generation Partnership Project; Technical Specification Group Services and System Aspects; Service requirements for Machine-Type Communications (MTC); Stage 1 (Release 11), Sep. 2011.
3GPP TR 23.888 V1.5.0, 3$^{rd}$ Generation Partnership Project; Technical Specification Group Services and System Aspects; System Improvements for Machine-Type Communications; (Release 11), Oct. 2011.
International Search Report dated Dec. 18, 2012.

* cited by examiner

| EVENT CONTENTS | CHARACTERISTICS CHANGE CONTENTS | |
|---|---|---|
| | CHARACTERISTICS TYPE | CONTENTS |
| ENGINE STOP | MOVE | STOP |
| ENGINE ACTIVATION | MOVE | MOVE START |
| NAVIGATION START | COMMUNICATION ISOLATION | 5 MINUTES |
| NAVIGATION END | COMMUNICATION ISOLATION | 1 HOUR |
| MULTIMEDIA USE START | COMMUNICATION BAND | UP TO 10 Mbps |
| MULTIMEDIA USE END | COMMUNICATION BAND | UP TO 1 Mbps |

Fig. 3

| CHARACTERISTICS CHANGE CONTENTS | | NW CONTROL POLICY | |
|---|---|---|---|
| CHARACTERISTICS TYPE | CONTENTS | CONTROL TYPE | CONTENTS |
| MOVE | STOP | PAGING AREA | CELL SIZE |
| | | POSITION REGISTRATION INTERVAL | 3 HOURS |
| MOVE | MOVE START | PAGING AREA | PREFECTURE LEVEL |
| | | POSITION REGISTRATION INTERVAL | 10 MINUTES |
| COMMUNICATION ISOLATION | 5 MINUTES | Idle TRANSITION INTERVAL | 5 MINUTES |
| | | INTERMITTENT RECEPTION INTERVAL (UE Specific DRX) | 0.128s |
| COMMUNICATION ISOLATION | 1 HOUR | Idle TRANSITION INTERVAL | 1 HOUR |
| | | INTERMITTENT RECEPTION INTERVAL (UE Specific DRX) | 128s |
| COMMUNICATION BAND | UP TO 10 Mbps | MAXIMUM ALLOWABLE BAND (UE-AMBR) | 10Mbps |
| COMMUNICATION BAND | UP TO 1 Mbps | MAXIMUM ALLOWABLE BAND (UE-AMBR) | 1Mbps |

Fig. 5

| TERMINAL IDENTIFIER | CHANGE DETECTION TYPE |
|---|---|
| TERMINAL1 | MOVE |
| | COMMUNICATION INTERVAL |
| | COMMUNICATION BAND |
| TERMINAL2 | MOVE |
| TERMINAL3 | COMMUNICATION INTERVAL |
| | COMMUNICATION BAND |

Fig. 9

MOBILE COMMUNICATION SYSTEM, DETECTION SERVER, CONTROL APPARATUS, MOBILE COMMUNICATION APPARATUS, NETWORK OPTIMIZING METHOD, AND NON-TRANSITORY COMPUTER READABLE MEDIUM HAVING PROGRAM STORED THEREON

CROSS-REFERENCE TO RELATED PATENT APPLICATIONS

This application is a continuation of U.S. application Ser. No. 14/372,325, filed on Jul. 15, 2014, which is a National Stage Entry of International Application No. PCT/JP2012/007339, filed Nov. 15, 2012, which claims priority from Japanese Patent Application No. 2012-006345, filed Jan. 16, 2012. The entire contents of the above-referenced applications are expressly incorporated herein by reference.

TECHNICAL FIELD

The present invention relates to a mobile communication system which determines control contents based on event contents notifications transmitted from a mobile communication apparatus.

BACKGROUND ART

In recent years, a method of optimizing a setting of each processing node which makes up a mobile communication system has been demanded. 3GPP proposes a method of optimizing network processing according to use characteristics of a mobile communication terminal (Non-Patent Literature 1). For example, network processing may be executed with respect to a terminal located by being fixed to a specific location to reduce control processing related to a move. More specifically, an interval at which the terminal executes position registration may be set longer than a predetermined time. Furthermore, when a mobile communication terminal is a terminal which allows a delay, network processing may be executed to transmit data to the mobile terminal by controlling a communication time and avoiding a timing at which a data transmission/reception amount comes to a peak.

Furthermore, 3GPP (3rd Generation Partnership Project) is discussing a network system configuration as illustrated in FIG. 19 to execute the above network processing (Non-Patent Literature 2). The network system in FIG. 19 includes a UE (User Equipment) 101, a RAN (Radio Access Network) 102, a SGSN (Serving GPRS Support Node) 103, a GGSN (Gateway GPRS Support Node) 104, a HLR (Home Location Register) 105, a MTC-IWF (Machine Type Communication-Inter Working Function) 106, a CDF (Charging Data Function) 107, a SMS-SC (Short Message Service-Service Center) 108, a MTC Server 109 and a MTC Application 110. The network system obtained by adding the MTC-IW 106, the CDF 107, the SMS-SC 108, the MTC Server 109 and the MTC Application 110 to a general mobile communication system in which the UE 101, the RAN 102, the SGSN 103, the GGSN 104 and the HLR 105 are used to realize a method of optimizing network processing according to use characteristics of a mobile communication terminal is being discussed.

CITATION LIST

Non Patent Literature

NPL 1: 3GPP TS 22.368 V11.3.0 (2011-09) 3rd Generation Partnership Project; Technical Specification Group Services and System Aspects; Service requirements for Machine-Type Communications (MTC); Stage 1 (Release 11)

NPL 2: 3GPP TR 23.888 V1.5.0 (2011-10) 3rd Generation Partnership Project; Technical Specification Group Services and System Aspects; System Improvements for Machine-Type Communications; (Release 11)

SUMMARY OF INVENTION

Technical Problem

However, as described above, network processing is optimized targeting at a mobile terminal whose use characteristics are fixed. For example, whether the mobile terminal is a terminal located by being fixed to a specific location or a terminal which allows a delay is determined using service information of the terminal and terminal information determined in advance. Currently, optimizing the network processing as described above and, in addition, executing optimization of network processing targeting at a mobile terminal whose use characteristics change is being demanded. Hence, executing optimization of network processing using information other than service information which generally changes less frequently is demanded.

To solve such a problem, an object of the present invention is to provide a mobile communication system, a detection server, a control apparatus, a mobile communication apparatus, a network optimizing method, and a program which can execute optimization of network processing based on a change of use characteristics.

Solution to Problem

A mobile communication system according to a first aspect of the present invention includes: a detection server that detects a characteristics change of a mobile communication apparatus based on an event notice transmitted from the mobile communication apparatus; and a control apparatus that determines control contents related to the mobile communication apparatus based on the characteristics change of the mobile communication apparatus detected by the detection server, and sets the determined control contents to a processing node that executes data transfer processing between the mobile communication apparatus and another mobile communication apparatus or control processing related to the data transfer processing.

A detection server according to a second aspect of the present invention includes: detecting means for detecting a characteristics change of a mobile communication apparatus based on an event notice transmitted from the mobile communication apparatus; and notifying means for transmitting a notification about the detected characteristics change to a control apparatus that determines control contents related to the mobile communication apparatus based on the characteristics change of the mobile communication apparatus, and sets the determined control contents to a processing node that executes data transfer processing between the mobile communication apparatus and another mobile communication apparatus or control processing related to the data transfer processing.

A control apparatus according to a third aspect of the present invention includes: control means for receiving a characteristics change of a mobile communication apparatus detected based on an event notice transmitted from the mobile communication apparatus, and determining control contents related to the mobile communication apparatus based on the characteristics change; and notifying means for transmitting a notification about the determined control contents to a processing node that executes data transfer processing between the mobile communication apparatus and another mobile communication apparatus or control processing related to the data transfer processing.

A mobile communication apparatus according to a fourth aspect of the present invention includes: detecting means for detecting a characteristics change of a mobile communication apparatus based on an event notice transmitted from the mobile communication apparatus; and notifying means for transmitting a notification about the detected characteristics change to a control apparatus that determines control contents related to the mobile communication apparatus based on the characteristics change of the mobile communication apparatus, and sets the determined control contents to a processing node that executes data transfer processing between the mobile communication apparatus and another mobile communication apparatus or control processing related to the data transfer processing.

A network optimizing method according to a fifth aspect of the present invention includes: detecting a characteristics change of a mobile communication apparatus based on an event notice transmitted from the mobile communication apparatus; determining control contents related to the mobile communication apparatus based on the detected characteristics change of the mobile communication apparatus; and setting the determined control contents to a processing node that executes data transfer processing between the mobile communication apparatus and another mobile communication apparatus or control processing related to the data transfer processing.

A program causing a computer to execute according to a sixth aspects of the present invention includes: a step of detecting a characteristics change of a mobile communication apparatus based on an event notice transmitted from the mobile communication apparatus; and a step of transmitting a notification about the detected characteristics change to a control apparatus that determines control contents related to the mobile communication apparatus based on the characteristics change of the mobile communication apparatus, and sets the determined control contents to a processing node that executes data transfer processing between the mobile communication apparatus and another mobile communication apparatus or control processing related to the data transfer processing.

Advantageous Effects of Invention

The present invention can provide a mobile communication system, a detection server, a control apparatus, a mobile communication apparatus, and a network optimizing method which can execute optimization of network processing based on a change of use characteristics.

BRIEF DESCRIPTION OF DRAWINGS

FIG. 3 is a configuration diagram of a characteristics change detecting DB according to the first embodiment.

FIG. 5 is a configuration diagram of a NW control policy DB according to the first embodiment.

FIG. 9 is a configuration diagram of a terminal specific detection item DB according to the second embodiment.

DESCRIPTION OF EMBODIMENTS

First Embodiment

Figure 1:
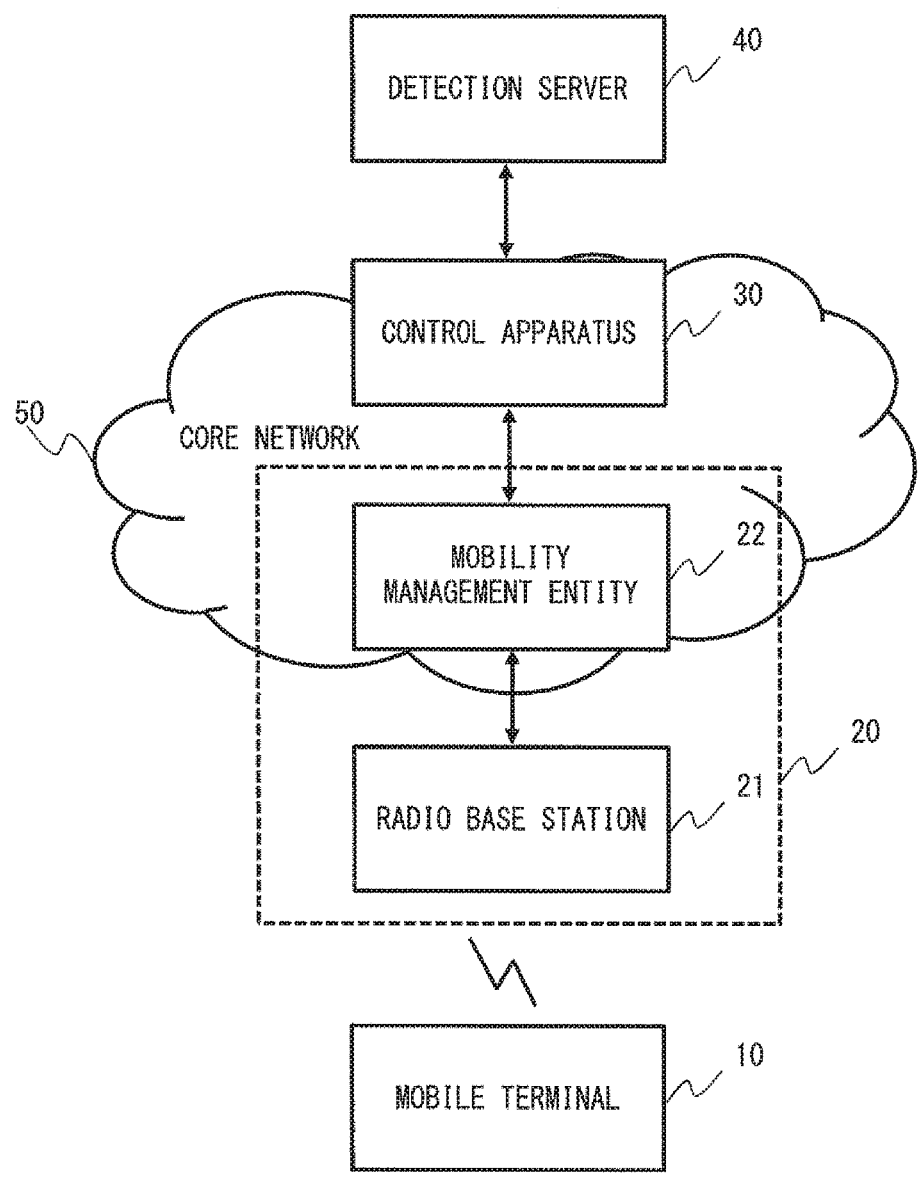
FIG. 1 is a configuration diagram of a mobile communication system according to a first embodiment.

Embodiments of the present invention will be described below with reference to the drawings. A configuration example of a mobile communication system according to the first embodiment of the present invention will be described with reference to FIG. 1. The mobile communication system in FIG. 1 has a detection server 40, a control apparatus 30 and a processing node 20. A mobile terminal 10 communicates with other mobile terminals and a server apparatus through the mobile communication system. Wireless communication is used for communication between the mobile terminal 10 and the mobile communication system. The processing node 20 may be, for example, a radio base station 21 or a mobility management entity 22. The mobility management entity 22 and the control apparatus 30 make up a core network 50 managed by a mobile communication business operator.

The mobile terminal 10 may be a mobile telephone terminal, a smartphone terminal or a notebook personal computer, or may be transporting means such as a car or a train in which a communication function is installed or a machine such as a watch which a user puts on and in which a communication function is installed. Alternatively, the mobile terminal 10 may be an apparatus which less frequently moves such as an automatic vending machine in which a communication function is installed.

The detection server 40 detects a characteristics change of a mobile communication apparatus based on an event notice transmitted from the mobile terminal 10. The detection server 40 may be arranged in the core network 50 managed by the mobile communication business operator, or may be arranged outside the core network 50 to be managed by a third party other than the mobile communication business operator.

An event notice may be, for example, information of a user operation of the mobile terminal 10 or sensor information detected by the mobile terminal 10. When, for example, the mobile terminal 10 is a car, the operation information may be information indicating that the user has turned on or off an engine of the car. Alternatively, the operation information may be information indicating that the user has started or stopped operating a car navigation system installed in the car or information indicating a position set as a destination. Alternatively, the operation information may be information indicating that the user has activated a moving image browsing software installed in a mobile telephone terminal. The sensor information may be information obtained by detecting environment information of the surroundings or information related to a temperature of the surroundings when, for example, a temperature sensor is mounted on a mobile telephone terminal. Furthermore, the sensor information may be velocity information of a mobile telephone when, for example, an acceleration sensor is mounted on a mobile telephone terminal.

A characteristics change may be, for example, a behavior change of the mobile terminal 10 and a change of a communication situation of the mobile terminal 10. When, for example, the mobile terminal 10 is a car and an event notice transmitted from the mobile terminal 10 notifies that an engine is turned off, the detection server 40 may detect a behavior change indicating that the car has stopped moving. Furthermore, when notified that the engine is turned on, the detection server 40 may detect a behavior change indicating that the car has started moving. When notification of an event indicating that the user has activated the moving image browsing software of the mobile telephone terminal is transmitted, the detection server 40 may detect a change of a communication situation indicating that the user is going to execute broadband communication from now. Furthermore, when notification of an event indicating that the user has performed an operation of starting a voice call of the mobile telephone terminal is transmitted, the detection server 40 may detect a change of a communication situation indicating that the user is going to execute narrowband communication from now.

As described above, the detection server 40 receives an event notice, and extracts a characteristics change of the mobile terminal 10 corresponding to the received event notice.

The control apparatus 30 determines control contents in the mobile terminal 10 based on the characteristics change of the mobile terminal 10 detected by the detection server 40, and sets the determined control contents to the processing node 20 which executes data transfer processing between the mobile terminal 10 and another mobile terminal or control processing related to data transfer.

The control contents in the mobile terminal 10 may be, for example, control of changing a paging area of the mobile terminal 10 or control of allocating a communication band to the mobile terminal 10. When, for example, the detection server 40 detects a characteristics change indicating that the mobile terminal 10 has stopped, the control apparatus 30 may perform control to narrow the paging area of the mobile terminal 10 to a cell size. A paging area refers to an area for calling the mobile terminal 10 when, for example, processing of receiving a call at the mobile terminal 10 is executed.

When the mobile terminal 10 stops, it is possible to narrow a call range and, consequently, narrow the paging area to a cell area in which the mobile terminal 10 exists and which is configured by a base station. Furthermore, when detecting a characteristics change indicating that the mobile terminal 10 has started to move, the control apparatus 30 may perform control to widen the paging area of the mobile terminal 10 in units of prefectures to enable the mobile terminal 10 to be reliably called.

In another example, when the detection server 40 detects a characteristics change indicating that the mobile terminal 10 has executed broadband communication, the control apparatus 30 may perform control to secure, for example, 10 Mbps as a bandwidth to be allocated to the mobile terminal 10. Furthermore, when the detection server 40 detects a characteristics change indicating that the mobile terminal 10 has executed narrowband communication, the control apparatus 30 may perform control to secure, for example, 1 Mbps as a bandwidth to be allocated to the mobile terminal 10.

The processing node which executes data transfer processing between the mobile terminal 10 and another mobile terminal may be, for example, the radio base station 21 or a switch (not illustrated). The processing node which executes control processing related to data transfer between the mobile terminal 10 and another mobile terminal may be, for example, the mobility management entity (MME) 22 which executes movement control of the mobile terminal 10 or a subscriber information server (HLR or HSS: Home Subscriber Server).

As described above, by using the mobile communication system in FIG. 1, the detection server 40 connected to the core network 50 can detect a characteristics change of the mobile terminal 10 based on an event notice transmitted from the mobile terminal 10. Furthermore, the control apparatus 30 arranged in the core network 50 can change contents to be set to the processing node 20 per mobile terminal according to the detected characteristics change. Consequently, it is possible to configure a network according to characteristics of each mobile terminal, and adequately distribute network resources or radio resources.

Figure 2:
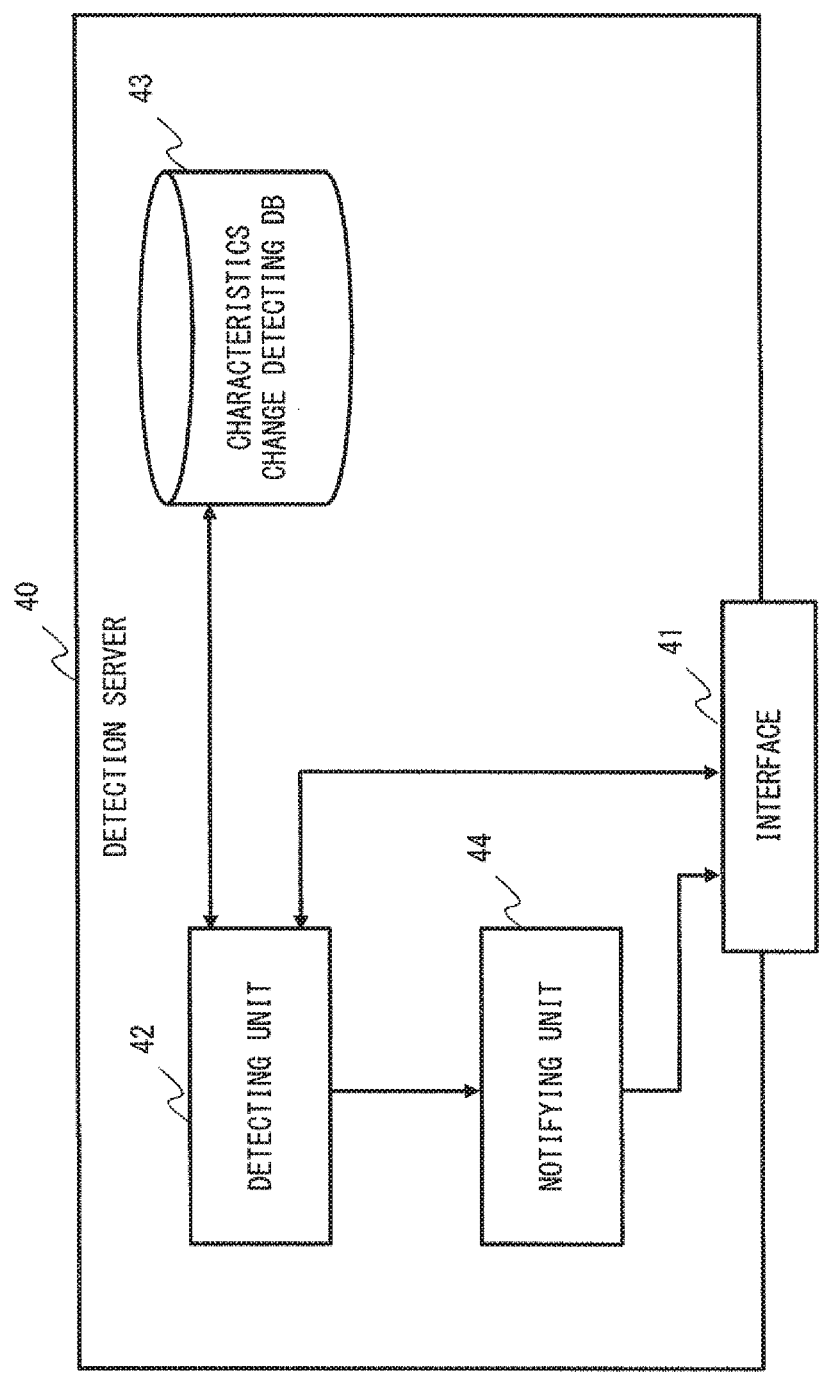
FIG. 2 is a configuration diagram of a detection server according to the first embodiment.

Next, a configuration example of the detection server 40 according to the first embodiment of the present invention will be descried with reference to FIG. 2. The detection server 40 has an interface 41, a detecting unit 42, a characteristics change detecting DB 43 and a notifying unit 44.

The interface 41 transmits and receives data to and from the control apparatus 30. Although FIG. 2 illustrates a configuration where the detection server 40 has one interface 41, the detection server 40 may have a plurality of interfaces to transmit and receive data to and from the radio base station 21 or the mobility management entity 22.

The detecting unit 42 receives an event notice transmitted from the mobile terminal 10, through the interface 41. The detecting unit 42 extracts a characteristics change corresponding to the received event notice using the characteristics change detecting database (DB) 43. Hereinafter, a configuration example of the characteristics change detecting DB 43 will be described with reference to FIG. 3.

The characteristics change detecting DB 43 in FIG. 3 associates and manages information related to event contents for which a notification is to be transmitted, and information related to characteristics change contents. Furthermore, the characteristics change contents are classified into a characteristics type and characteristics contents corresponding to the characteristics type. For example, the event contents include engine stop, engine activation, navigation start, navigation stop, multimedia use start and multimedia use end. Event contents indicating engine stop are associated with a move as a characteristic type and characteristics change contents indicating stop as contents. That is, when an event notification indicating that an engine has stopped is transmitted from the mobile terminal 10, the detecting unit 42 detects that the mobile terminal 10 has stopped moving. When an event notification indicating that the engine has been activated is transmitted from the mobile terminal 10, the detecting unit 42 detects that the mobile terminal 10 has started to move.

Furthermore, when an event notification indicating that navigation has started is transmitted from the mobile terminal 10, the detecting unit 42 detects that a communication interval such as an information distribution interval for the navigation system is five minutes. When an event notification indicating that navigation has ended is transmitted from the mobile terminal 10, the detecting unit 42 detects that a communication interval such as an information distribution interval for the navigation system is one hour. Furthermore, when an event notification indicating that use of multimedia has started has been transmitted from the mobile terminal 10, the detecting unit 42 detects that the mobile terminal 10 uses a communication band up to 10 Mbps. When an event notification indicating that use of the multimedia ends has been transmitted from the mobile terminal 10, the detecting unit 42 detects that the mobile terminal 10 uses a communication band up to 1 Mbps.

Referring back to FIG. 2, when the characteristics change corresponding to the event contents notification transmitted from the mobile terminal 10 is extracted, the detecting unit 42 outputs the extracted characteristics change to the notifying unit 44.

The notifying unit 44 outputs the characteristics change output from the detecting unit 42 to the control apparatus 30 through the interface 41.

Figure 4:
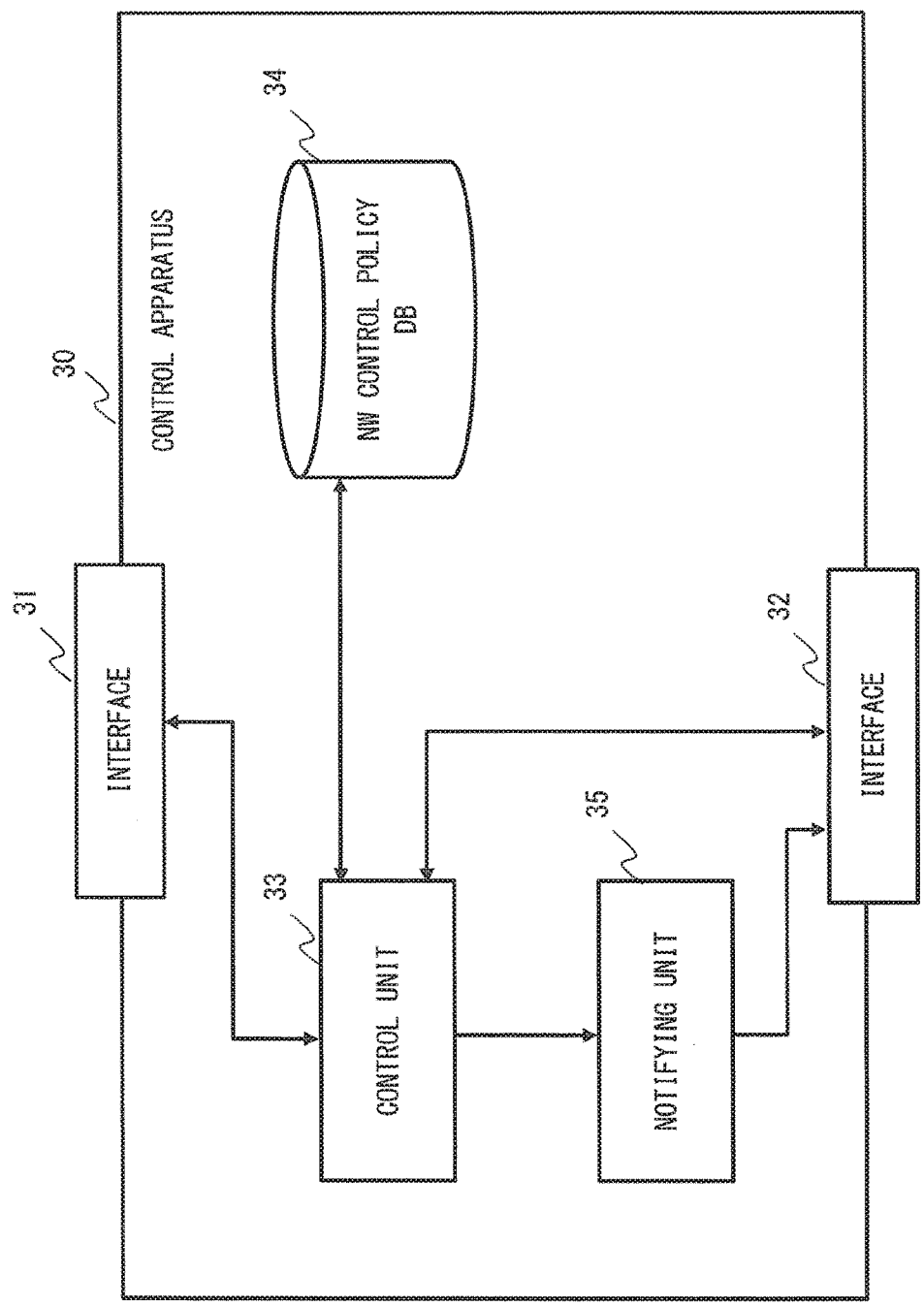
FIG. 4 is a configuration diagram of a control apparatus according to the first embodiment.

Next, a configuration example of the control apparatus 30 according to the first embodiment of the present invention will be described with reference to FIG. 4. The control apparatus 30 has interfaces 31 and 32, a control unit 33, a NW (Network) control policy DB 34 and a notifying unit 35.

The interface 31 transmits and receives data to and from the detection server 40. The interface 32 transmits and receives data to and from the processing node 20. When the radio base station 21 and the mobility management entity 22 transmit and receive data using different interfaces, different interfaces may be used per apparatus of a communicating party which transmits and receives data.

The control unit 33 receives information related to the characteristics change of the mobile terminal 10 output from the detection server 40, through the interface 31. Furthermore, the control unit 33 may output the event notice received from the mobile terminal 10 through the interface 32, to the detection server 40 through the interface 31. The control unit 33 extracts a NW control policy corresponding to the received characteristics change using the NW control policy DB 34. Hereinafter, a configuration example of the NW control policy DB 34 will be described with reference to FIG. 5.

The NW control policy DB 34 in FIG. 5 associates and manages information related to characteristics change contents and information related to a NW control policy. Information related to characteristics change contents is the same as characteristics change contents in the characteristics change detecting DB 43. Information related to a NW control policy is classified into a control type and control contents corresponding to the control type.

When, for example, the detection server 40 transmits a notification of information indicating a move as a characteristics type and move stop as characteristics change contents, the control unit 33 determines a NW control policy of setting a size of a paging area related to the mobile terminal 10 to a cell size managed by one base station, and determines a position registration interval of the mobile terminal 10 as every three hours. Furthermore, when the detection server 40 transmits a notification of information indicating a move as a characteristics type and a move start as characteristics change contents, the control unit 33 may determine a NW control policy of setting a size of a paging area related to the mobile terminal 10 to a size in units of prefectures, and determine a position registration interval of the mobile terminal 10 as every ten minutes.

That is, when the mobile terminal 10 stops moving, a movement range narrows, so that it is also possible to set a narrow paging area. Consequently, it is possible to set only a cell area configured by one base station to a paging area. In contrast with this, when the mobile terminal 10 starts moving, a movement range widens. Hence, it is necessary to widen the paging area to enable the mobile terminal 10 to be reliably called. Consequently, for example, all cell areas configured by base stations in the same prefecture may be set to a paging area. Furthermore, when the mobile terminal 10 stops moving, the mobile terminal 10 is highly likely to exist in the same position registration area and therefore a long position registration interval may be set and, when the mobile terminal 10 starts moving, the mobile terminal 10 is highly likely to exist in position registration areas which differ as the time passes and therefore a short position registration interval may be set.

Still further, when the detection server 40 transmits a notification of information indicating a communication interval as a characteristics type and five minutes as characteristics change contents, the control unit 33 may set an interval at which the mobile terminal 10 operates in a normal power mode to five minutes and set an intermittent reception interval to 0.128 s. The mobile terminal 10 operates in a power-saving mode when the mobile terminal 10 does not operate in the normal power mode. When the detection server 10 transmits a notification of information indicating a communication interval as a characteristics type and one hour as characteristics change contents, the control unit 33 may set an interval at which the mobile terminal 10 operates in the normal power mode to one hour and set the intermittent reception interval to 128 s.

Furthermore, when the detection server 40 transmits a notification of information indicating a communication band as a characteristics type and up to 10 Mbps as characteristics change contents, the control unit 33 may set to a maximum allowable band to be allocated to the mobile terminal 10 to 10 Mbps. When the detection server 40 transmits a notification of information indicating a communication band as a characteristics type and up to 1 Mbps as characteristics change contents, the control unit 33 may set a maximum allowable band to be allocated to the mobile terminal 10 to 1 Mbps.

Referring back to FIG. 4, the NW control policy extracted using the NW control policy DB 34 is output to the notifying unit 35. The notifying unit 35 outputs the NW control policy to the processing node 20 through the interface 32.

Figure 6:
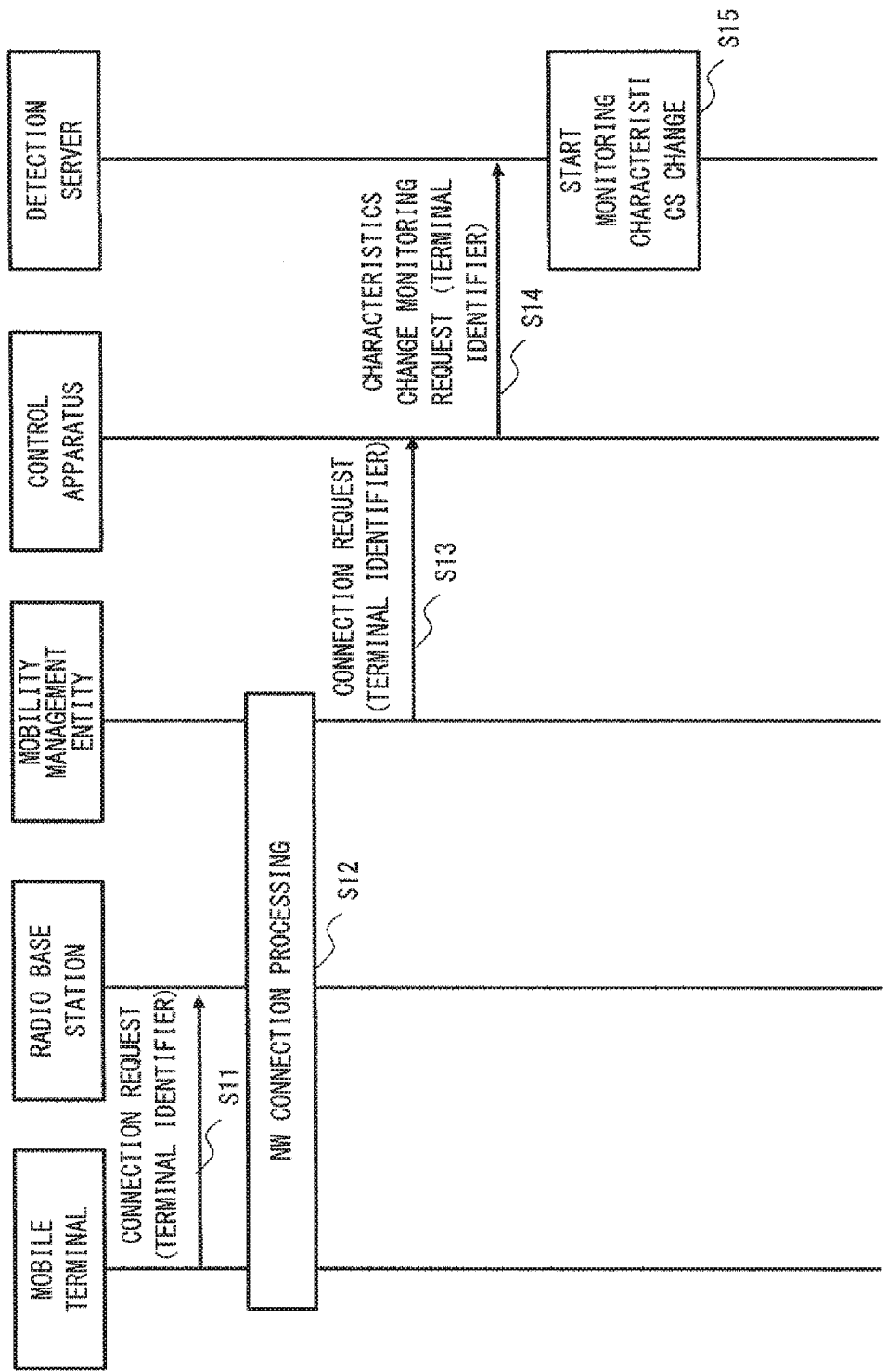
FIG. 6 illustrates a sequence illustrating a flow of processing of registering a mobile terminal according to the first embodiment.

Next, a flow of processing of registering a mobile terminal which is a characteristics change monitoring target, in the detection server according to the first embodiment of the present invention will be described with reference to FIG. 6. First, the mobile terminal 10 transmits a connection request to the radio base station 21 (S11). When, for example, the mobile terminal 10 is powered on, the connection request is executed. A terminal identifier of the mobile terminal 10 is also included in a message related to the connection request. The mobile terminal identifier is, for example, a model number, a telephone number, a MAC (Media Access Control) address or an IP (Internet Protocol) address allocated to the mobile terminal 10.

Next, when the connection request from the mobile terminal 10 is executed, NW connection processing is performed between the mobile terminal 10, the radio base station 21 and the mobility management entity 22 (S12). The NW connection processing is directed to providing a state where communication can be executed between the mobile terminal 10 and the radio base station 21 and is general processing in mobile communication, and therefore will not be described in detail.

Next, the mobility management entity 22 transmits a message related to the connection request transmitted from the mobile terminal 10, to the control apparatus 30 (S13). The terminal identifier of the mobile terminal 10 is also included in the message transmitted from the mobility management entity 22 to the control apparatus 30 and the message is related to the connection request.

Next, the control apparatus 30 transmits a characteristics change monitoring request message to the detection server 40 to set the mobile terminal 10 to a characteristics change monitoring target terminal in the detection server 40 (S14). Furthermore, the control apparatus 30 includes the terminal identifier of the mobile terminal 10 in the characteristics change monitoring request message and transmits the characteristics change monitoring request message to clarify the mobile terminal 10 requested as a monitoring target terminal.

Next, the detection server 40 starts monitoring the characteristics change of the mobile terminal 10 corresponding to the terminal identifier set to the characteristics change monitoring request message (S15).

Next, a flow of processing of setting a NW control policy according to the first embodiment of the present invention will be described with reference to FIG. 7. The processing of setting a NW control policy is executed after the processing of registering the mobile terminal in FIG. 6.

First, the mobile terminal 10 transmits an event notice to the detection server 40 (S21). The event notice includes the terminal identifier of the mobile terminal 10 and contents of an event which occurs. Next, the detection server 40 detects a characteristics change of the mobile terminal 10 corresponding to the event contents in the notification (S22). Subsequently, the detection server 40 transmits a notification about the detected characteristics change to the control apparatus 30 (S23). The terminal identifier of the mobile terminal 10 is also included in the message in which a notification about the characteristics change is transmitted from the detection server 40 to the control apparatus 30.

Next, the control apparatus 30 determines NW control policy contents corresponding to the characteristics change which the detection server 40 has transmitted a notification about (S24). Next, the control apparatus 30 transmits a notification about the determined NW control policy to the mobility management entity 22 (S25). The control apparatus 30 also notifies the mobility management entity 22 about the NW control policy and the mobile terminal identifier of the mobile terminal 10.

Next, the mobility management entity 22 changes the NW control policy related to the mobile terminal 10, to the NW control policy which the control apparatus 30 has transmitted a notification about (S26).

In this regard, although a notification about the NW control policy is transmitted to the mobility management entity 22 in step S25, the notification about the NW control policy may be transmitted to the radio base station 21. For example, the control apparatus 30 may determine a notice destination according to a NW control policy by transmitting a notification about the NW control policy to the mobility management entity 22 when a control type is a NW control policy related to a paging area, and by transmitting a notification about the NW control policy to the radio base station 21 when the control type is a NW control policy related to a maximum allowable band. Furthermore, the control apparatus 30 may transmit a notification about a NW control policy which needs to be set, to another apparatus such as a switch which makes up the core network in addition to the radio base station 21 and the mobility management entity 22.

As described above, by using the mobile communication system according to the first embodiment of the present invention, the detection server 40 can receive information related to event contents from the mobile terminal 10. The detection server 40 can detect a characteristics change based on information related to event contents, and the control apparatus 30 can determine a NW control policy based on the characteristics change. Consequently, the mobile communication system can set an optimal NW control policy according to the characteristics change in the mobile terminal 10.

Furthermore, although an example has been described in the first embodiment of the present invention where the detection server detects a characteristics change based on a notification of event contents transmitted from the mobile terminal 10, the detection server 40 may detect a characteristics change by analyzing contents of data transmitted from the mobile terminal 10. The detection server 40 may detect a characteristics change using data transmitted from the mobile terminal 10 as word information disclosed in a document such as an electronic mail. Alternatively, the detection server 40 may detect a characteristics change by analyzing video data and audio data.

Figure 19:
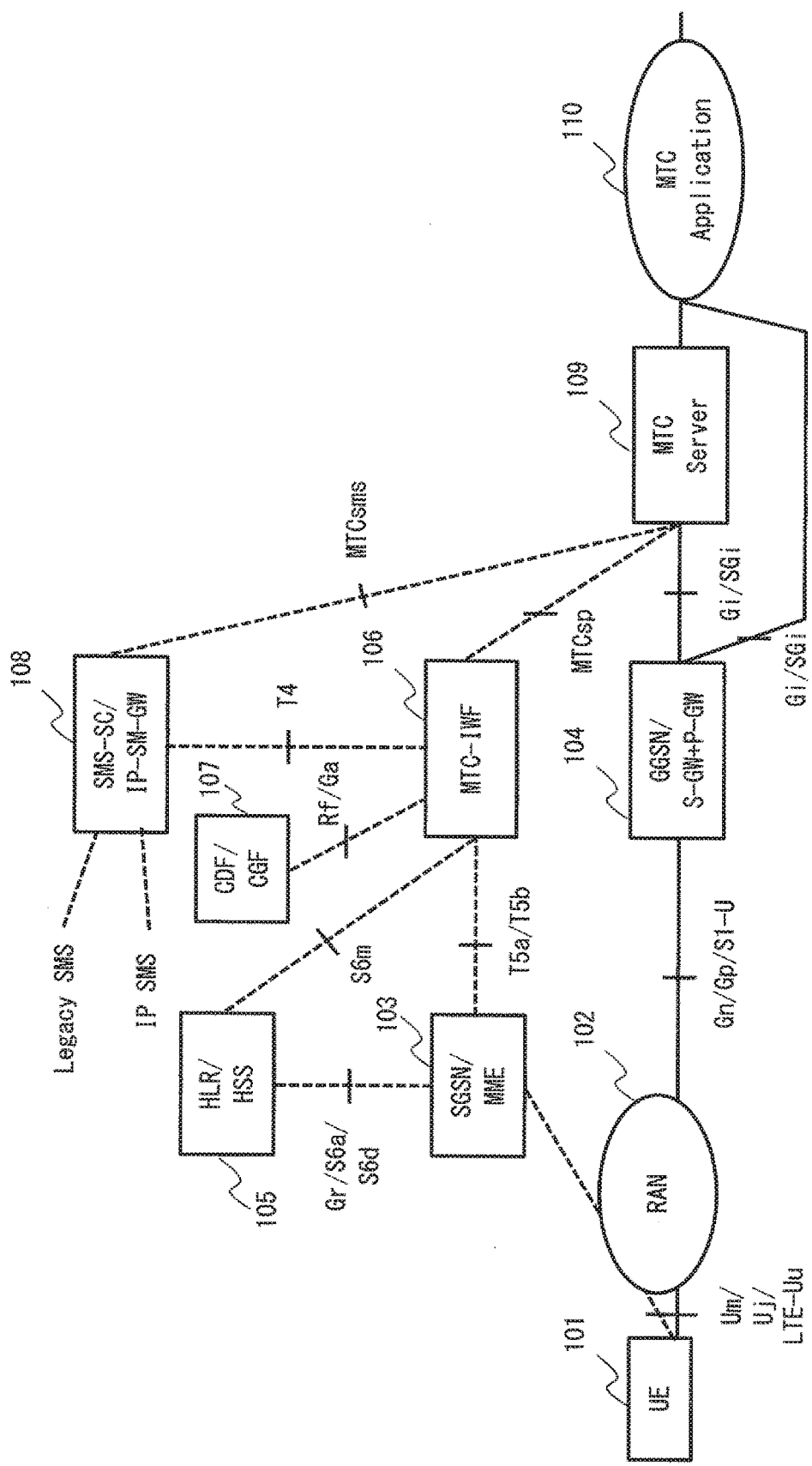
FIG. 19 illustrates a network system configuration discussed in 3GPP.

Furthermore, the detection server 40, the control apparatus 30 and the processing node 20 may be associated with apparatuses discussed by 3GPP in FIG. 19 as follows. For example, the detection server 40 may correspond to a MTC Application 110, the control apparatus 30 may correspond to a MTC-IWF 106, a CDF/CGF (CDF/Charging Gateway Function) 107, a SMS-SC/IP-SM-GW 108 and a MTC Server 109, and a processing node may correspond to a SGSN/MME 103, a GGSN/S-GW+P-GW 104 and a HLR/HSS 105.

Second Embodiment

Next, a configuration example of a detection server 40 according to the second embodiment of the present invention will be described with reference to FIG. 8. The detection server 40 has an interface 41, a detecting unit 42, a characteristics change detecting DB 43, a notifying unit 44 and a terminal specific detection item DB 45. The components other than the terminal specific detection item DB 45 are the same as those in FIG. 2, and therefore will not be described in detail.

The terminal specific detection item DB 45 manages, per mobile terminal, items related to a characteristics change of a mobile terminal which the detection server 40 needs to detect. Hereinafter, a configuration example of the terminal specific detection item DB 45 according to the second embodiment of the present invention will be described with reference to FIG. 9.

The terminal specific detection item DB 45 associates and manages a terminal identifier and a characteristics type regarding which a notification needs to be transmitted. The terminal identifier may be, for example, a model number, a telephone number, a MAC address or an IP address allocated to each mobile terminal. In FIG. 8, for example, terminal identifiers identified as terminals 1 to 3 are managed. The characteristics type which needs to be detected is the same as the characteristics type described with reference to FIGS. 3 and 5.

Figure 8:
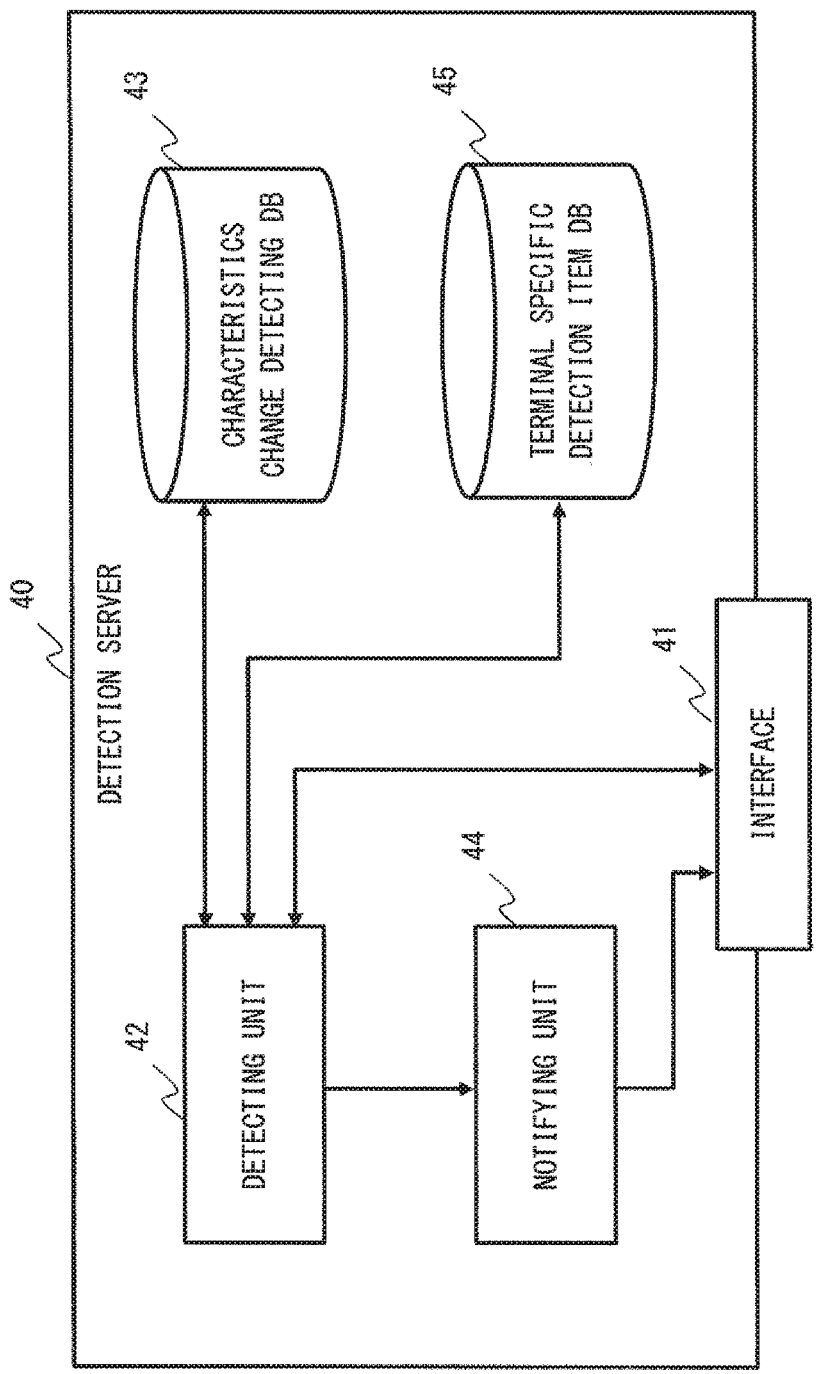
FIG. 8 is a configuration diagram of a detection server according to a second embodiment.

In FIG. 8, move, a communication interval and a communication band are associated as characteristics types with the terminal 1. A move is associated as a characteristics type with the terminal 2, and a communication interval and a communication band are associated as characteristics types with the terminal 3. That is, for example, only the characteristics change related to a move is detected for the terminal 2. Hence, in an example in FIG. 3, although the terminal 2 detects a characteristics change and executes processing when a notification of event contents indicating engine stop or engine activation is transmitted, the terminal 2 does not execute processing of detecting a characteristics change even when a notification of event contents indicating navigation start and end or multimedia use start and use end is transmitted.

Next, a flow of processing of registering a mobile terminal which is a characteristics change monitoring target, in a detection server according to the second embodiment of the present invention will be described with reference to FIG. 10. Steps S31 to S33 and step S35 are the same as steps S11 to 13 and step S15 in FIG. 6, and therefore will not be described.

In step S34, a control apparatus 30 transmits a notification of a characteristics change monitoring request message to the detection server 40. The characteristics change monitoring request includes information related to a terminal identifier of a mobile terminal 10 and a characteristics type which needs to be detected.

Figure 10:
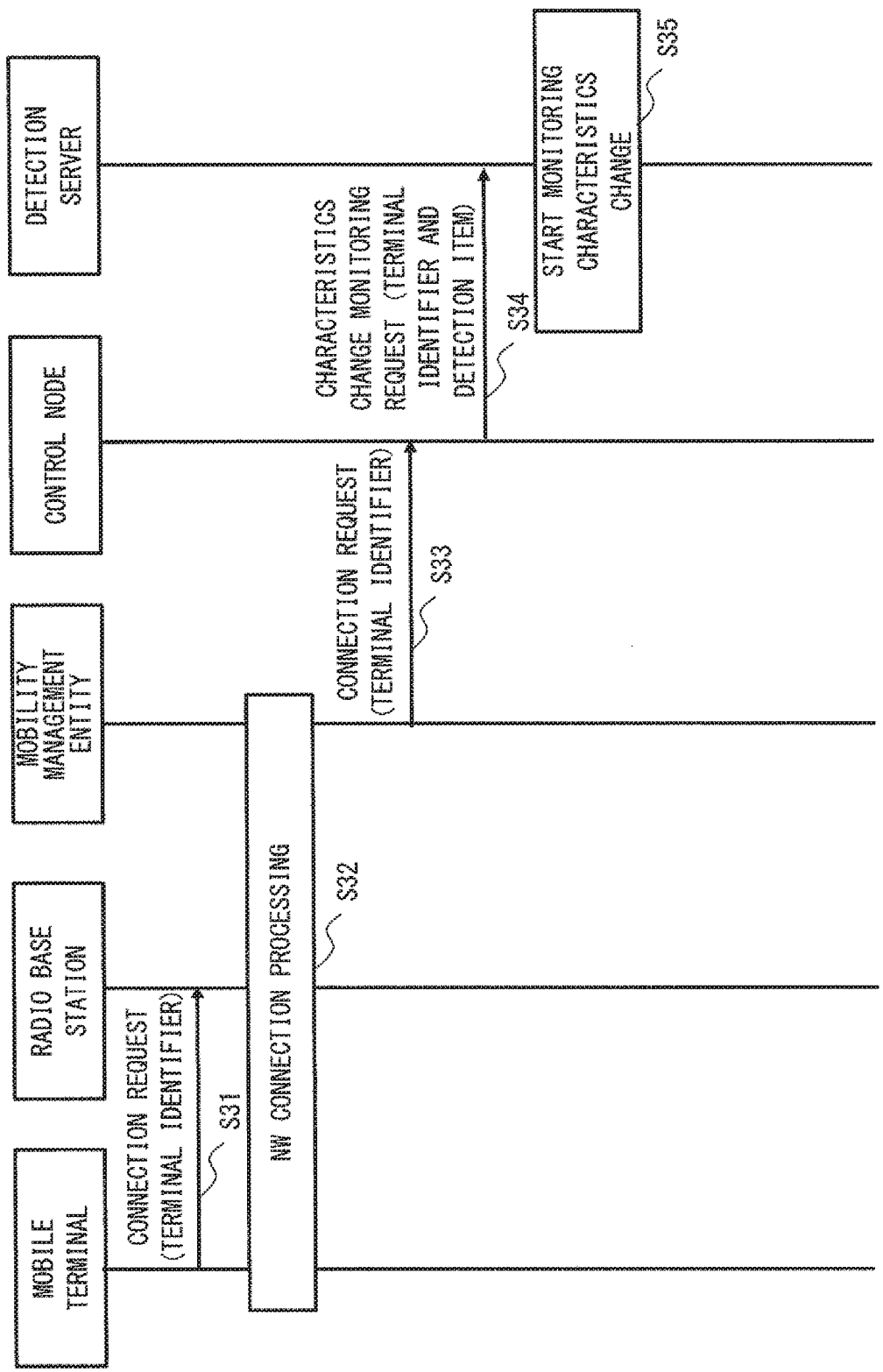
FIG. 10 illustrates a sequence illustrating a flow of processing of registering a mobile terminal according to the second embodiment.

Although FIG. 10 illustrates an example where the mobile terminal 10 transmits a notification of information related to a characteristics type which needs to be detected, information related to a characteristics type which needs to be detected may be acquired from a subscriber server which manages subscriber information of a plurality of mobile terminals. In this case, information related to a characteristics type which needs to be detected per mobile terminal is registered in advance in the subscriber server.

Figure 11:
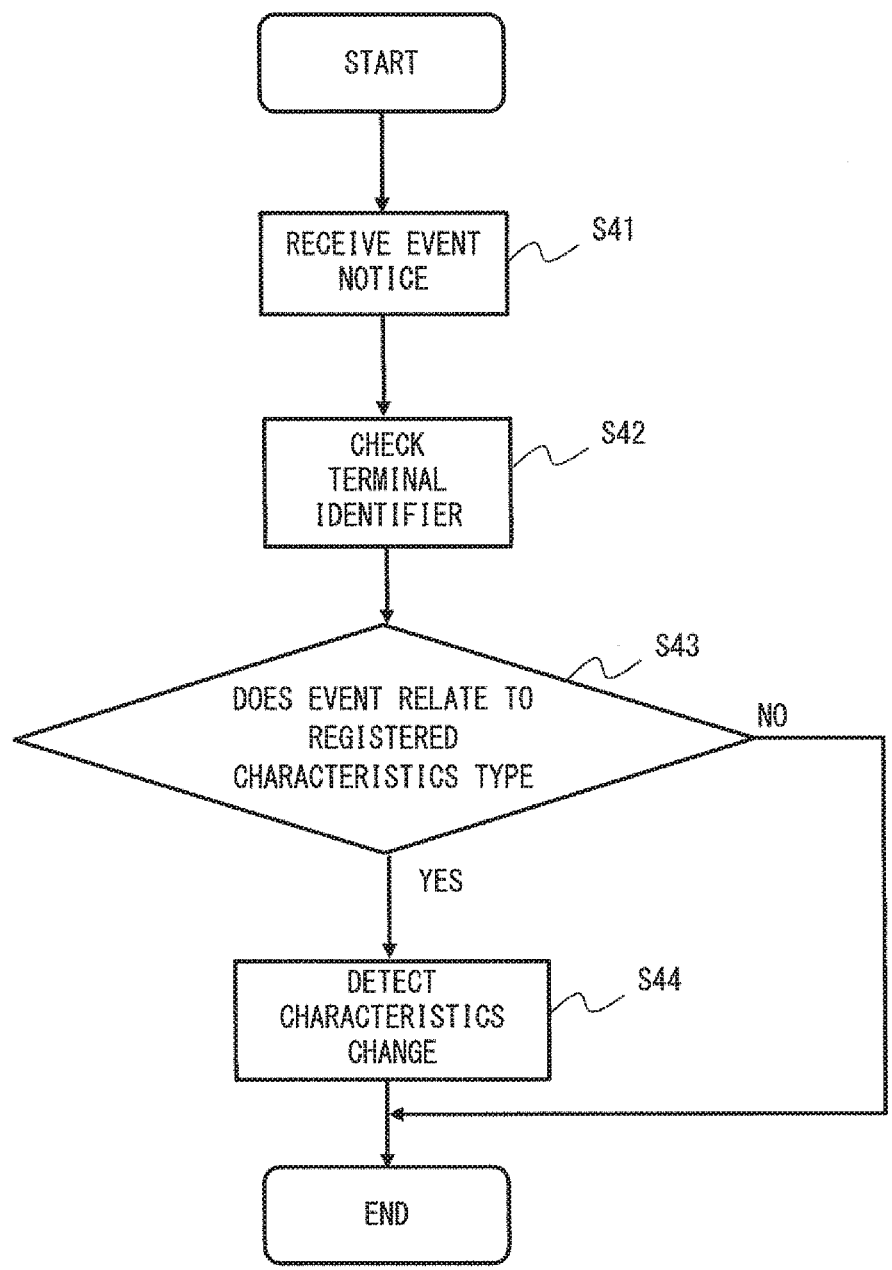
FIG. 11 is a view illustrating a flow of processing of detecting a characteristics change in the detection server according to the second embodiment.

Next, a flow of processing of detecting a characteristics change in the detection server 40 according to the second embodiment of the present invention will be described with reference to FIG. 11. First, the detecting unit 42 receives an event notice from the mobile terminal 10 (S41). Next, the detecting unit 42 checks a terminal identifier included in the event notice, and identifies a mobile terminal which is a transmission source of the event notice (S42). Next, the detecting unit 42 determines whether or not event contents indicate the event related to the characteristics type managed by being associated with the identified mobile terminal in the terminal specific detection item DB 45 (S43). When determining that event contents regarding which a notification has been transmitted from the mobile terminal 10 indicate the event related to the characteristics type managed in the terminal specific detection item DB 45, the detecting unit 42 detects the characteristics change of the mobile terminal 10 using the characteristics change detecting DB 43 (S44). When determining that the event contents regarding which a notification has been transmitted from the mobile terminal 10 do not indicate the event related to the characteristics type managed in the terminal specific detection item DB 45, the detecting unit 42 finishes processing. In this regard, when the processing is finished, the detection server 40 may notify the control apparatus 30 that the processing is finished. Alternatively, when determining that the event contents regarding which a notification has been transmitted from the mobile terminal 10 do not indicate the event related to the characteristics type managed in the terminal specific detection item DB 45, an inquiry whether or not the characteristics change related to the event contents regarding which a notification has been transmitted becomes a monitoring target may be transmitted to the mobile terminal 10.

Figure 7:
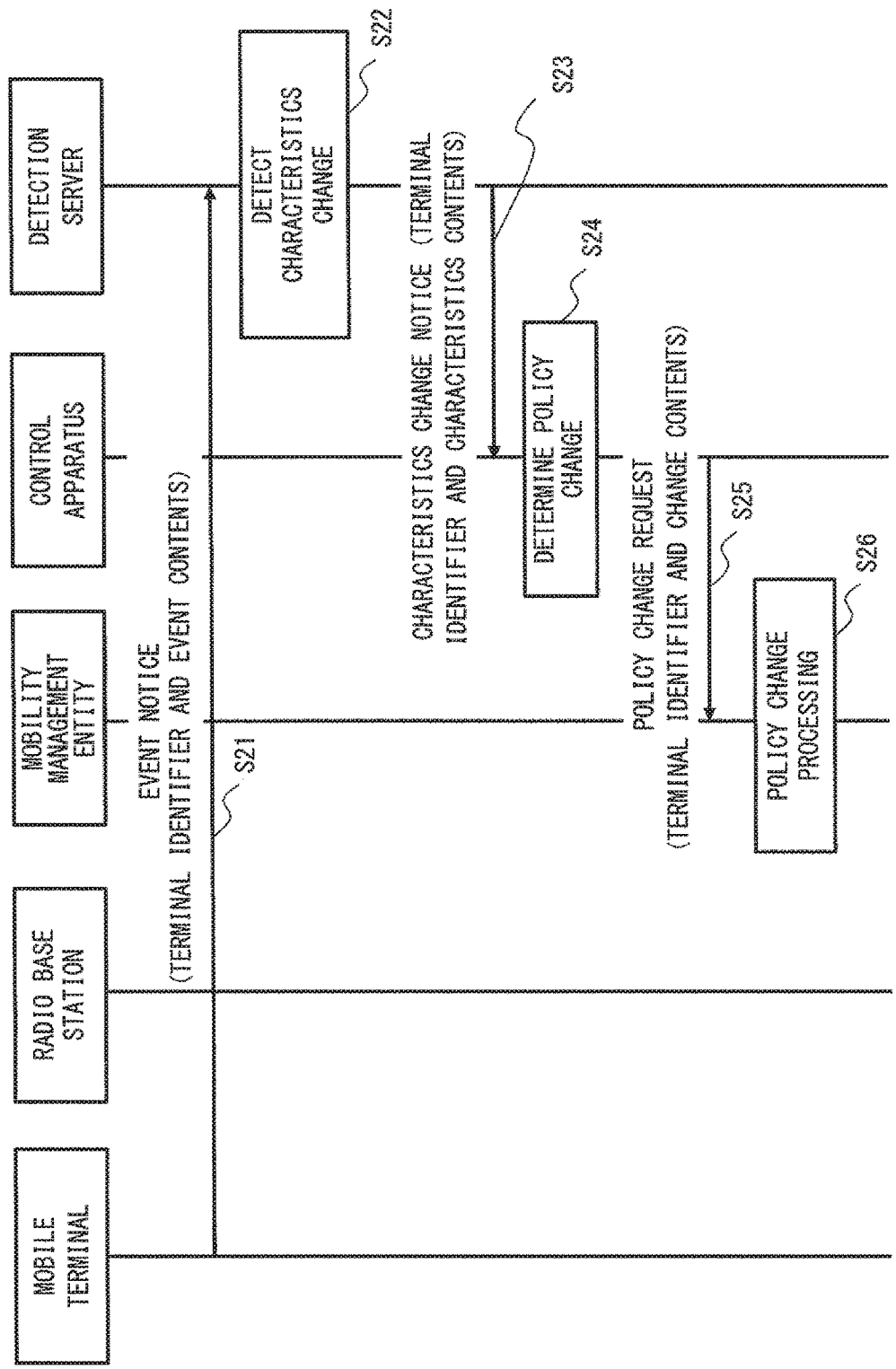
FIG. 7 illustrates a sequence illustrating a flow of processing of setting a NW control policy according to the first embodiment.

Processing after the characteristics change is detected is the same as the processing subsequent to step S23 in FIG. 7.

As described above, by using the mobile communication system according to the second embodiment of the present invention, the detection server 40 can register in advance a characteristics change which needs to be detected. When, for example, an automatic vending machine which is less frequently moved is used as a mobile terminal, it is not necessary to detect a characteristics change related to a move. In such a case, a move is not registered as a characteristics type which needs to be detected. By so doing, it is possible to reduce a processing load related to detection processing of the detection server 40.

Third Embodiment

Next, a configuration example of a mobile communication system according to the third embodiment of the present invention will be described. A control apparatus 30 and a processing node 20 have been described as physically different apparatuses in the first and second embodiments. In this regard, a function executed in the control apparatus 30 may be installed in a mobility management entity 22 in the third embodiment.

Figure 12:
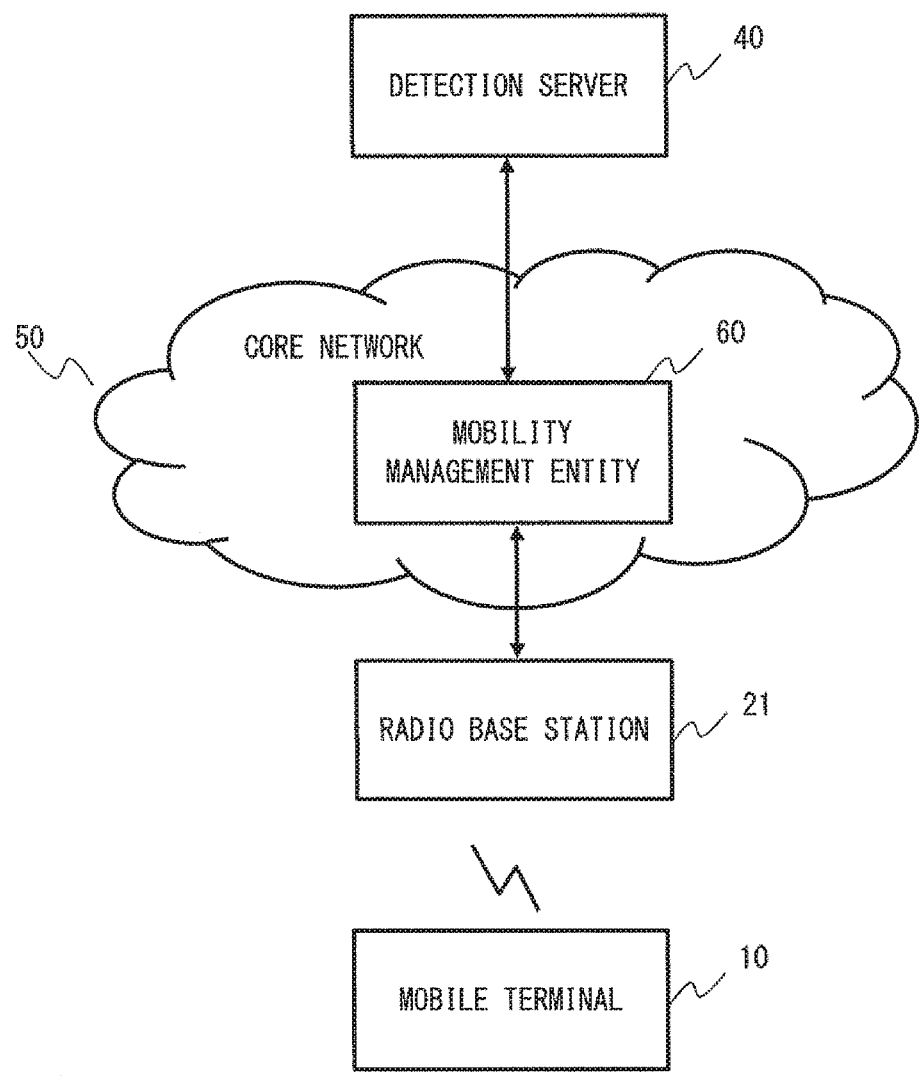
FIG. 12 is a configuration diagram of a mobile communication system according to a third embodiment.

A configuration example of the mobile communication system according to the third embodiment of the present invention will be described with reference to FIG. 12. Hereinafter, differences between FIGS. 1 and 12 will be mainly described. The mobile communication system in FIG. 12 has a radio base station 21, a detection server 40 and a mobility management entity 60.

Figure 13:
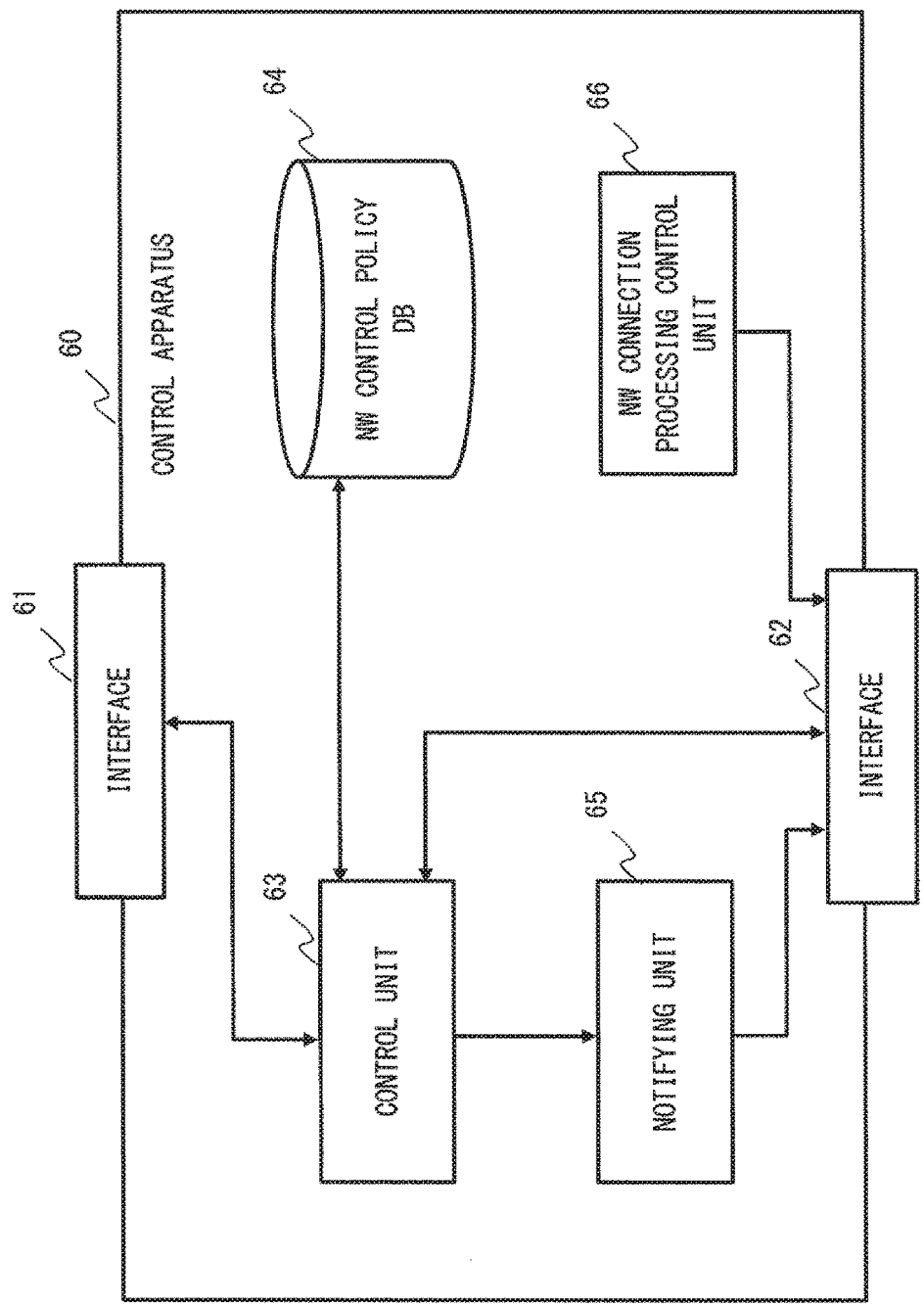
FIG. 13 is a configuration diagram of a mobility management entity according to the third embodiment.

Next, a configuration example of the mobility management entity 60 according to the third embodiment of the present invention will be described with reference to FIG. 13. The mobility management entity 60 has interfaces 61 and 62, a control unit 63, a NW control policy DB 64, a notifying unit 65 and a NW connection processing control unit 66.

The interface 61 transmits and receives data to and from the detection server 40. The interface 62 transmits and receives data to and from the mobility management entity 22.

The control unit 63 receives information related to a characteristics change of a mobile terminal 10 output from the detection server 40, through the interface 61. Furthermore, the control unit 63 may output an event notice received from the mobile terminal 10 through the interface 62, to the detection server 40 through the interface 61. The control unit 63 extracts a NW control policy corresponding to the received characteristics change using the NW control policy DB 64. The NW control policy DB 64 is the same as the configuration in FIG. 5, and therefore will not be described in detail.

Furthermore, the control unit 63 performs processing of applying the NW control policy extracted from the NW control policy DB 64, and setting the NW control policy. Alternatively, the control unit 63 may transmit a notification of the NW control policy extracted from the NW control policy DB 64, to the base station 21 through the notifying unit 65 and the interface 62.

When a connection request from the mobile terminal 10 is executed, the NW connection processing control unit 66 controls NW connection processing to provide a state where communication can be executed between the mobile terminal 10 and the radio base station 21. The NW connection processing is general processing in mobile communication, and therefore will not be described in detail.

Figure 14:
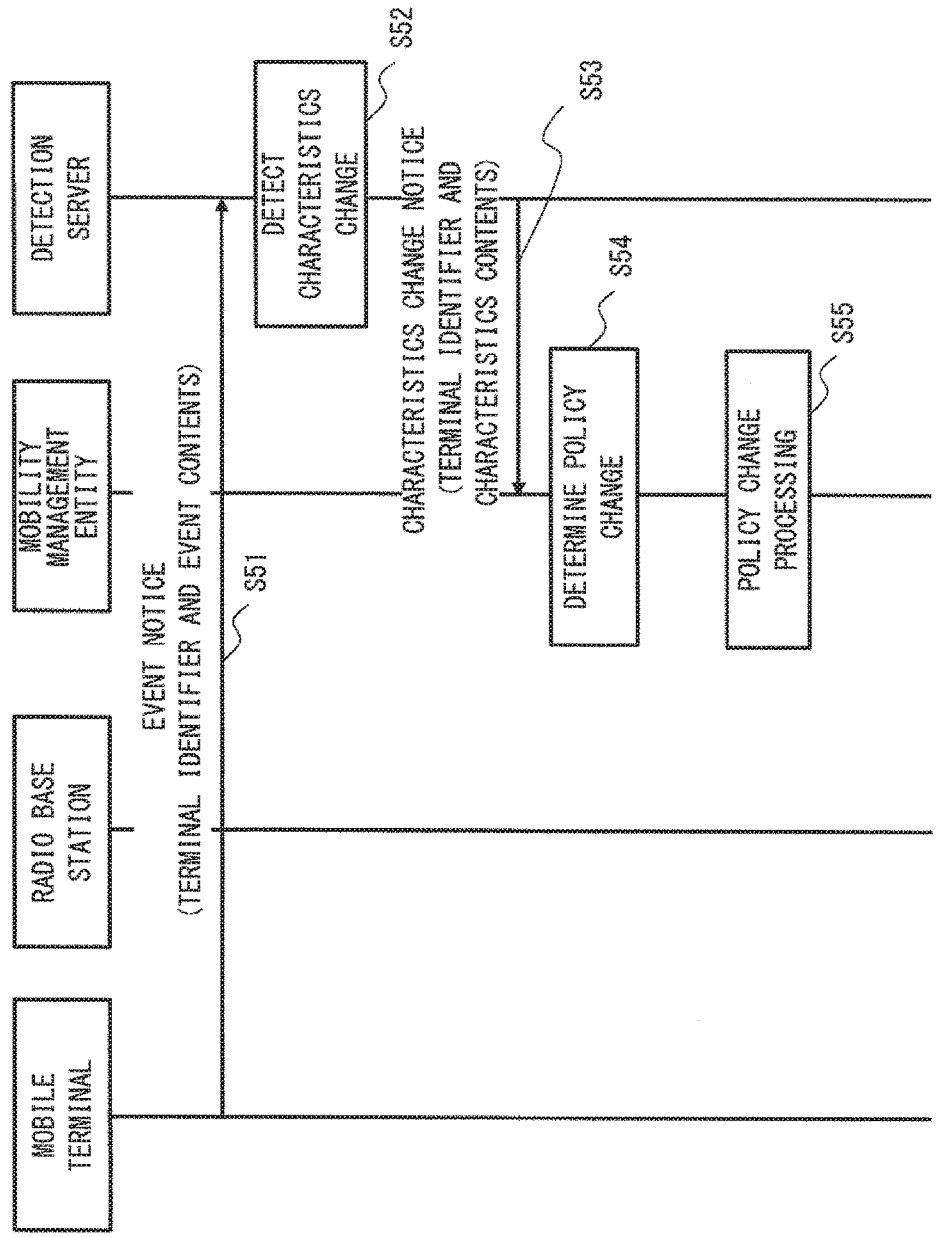
FIG. 14 illustrates a sequence illustrating a flow of processing of setting a NW control policy according to the third embodiment.

Next, a flow of processing of setting a NW control policy according to the third embodiment of the present invention will be described with reference to FIG. 14. Step S51 to step S53 in FIG. 14 are the same as step S21 to step S23 in FIG. 7, and therefore will not be described in detail.

Next, the mobility management entity 60 determines NW control policy contents corresponding to the characteristics change regarding which a notification has been transmitted from the detection server 40 (S54). Next, the mobility management entity 60 changes the currently set NW control policy to the NW control policy determined in step S54 (S55).

As described above, the mobility management entity 60 according to the third embodiment of the present invention includes a function of the control apparatus 30 in FIG. 1. Consequently, an interface between the control apparatus 30 and the mobility management entity 22 in FIG. 1 is not necessary. Furthermore, it is not necessary to transmit and receive data between the control apparatus 30 and the mobility management entity 22 in FIG. 7, so that it is possible to reduce a signal amount of the entire mobile communication system.

Fourth Embodiment

Figure 15:
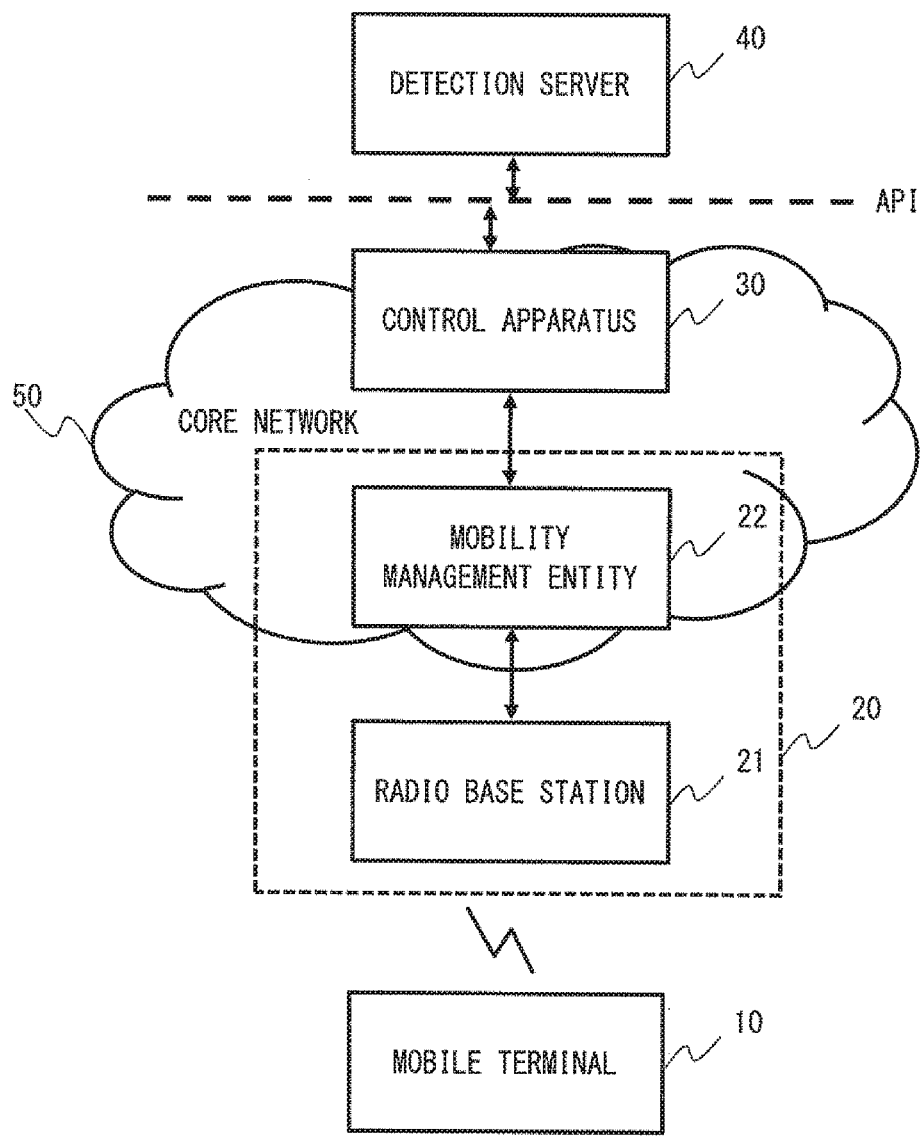
FIG. 15 is a configuration diagram of a mobile communication system according to a fourth embodiment.

Next, a configuration example of a mobile communication system according to the fourth embodiment of the present invention will be described with reference to FIG. 15. The mobile communication system in FIG. 15 defines an API between a control apparatus 30 and a detection server 40, and executes data communication between the control apparatus 30 and the detection server 40. The detection server 40 executes data processing using a function provided by the API.

A mobile communication business operator managing the mobile communication system provides the API between the control apparatus 30 and the detection server 40, so that the detection server 40 can be managed by a third party other than the mobile communication business operator and can be arranged outside a core network 50. Consequently, the third party can operate and manage the detection server 40.

Fifth Embodiment

Figure 16:
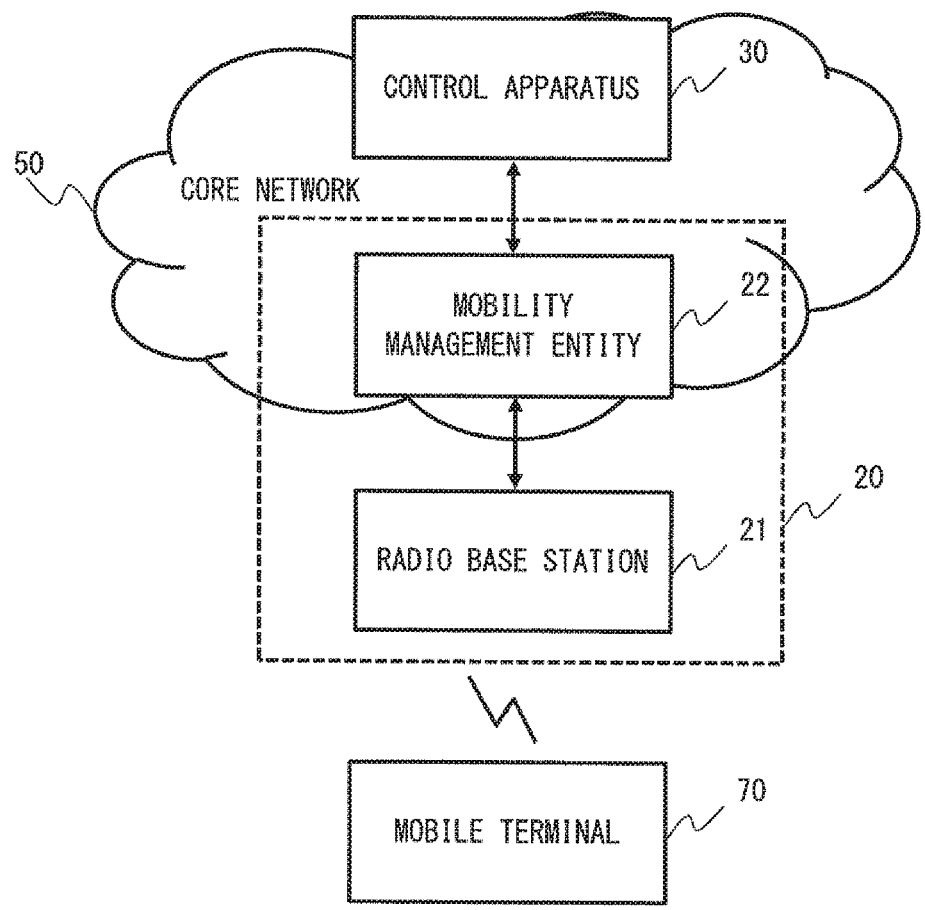
FIG. 16 is a configuration diagram of a mobile communication system according to a fifth embodiment.

Next, a configuration example of a mobile communication system according to the fifth embodiment of the present invention will be described with reference to FIG. 16. An example will be described in the fifth embodiment where a function executed in a detection server 40 is installed in a mobile terminal 70. The mobile communication system in FIG. 16 has a control apparatus 30, a base station 21 and a mobility management entity 22. The mobile terminal 70 communicates with other mobile terminals and a server apparatus through the mobile communication system. The mobile communication system in FIG. 16 differs from the mobile communication system in FIG. 1 in that the detection server 40 is not provided.

Figure 17:
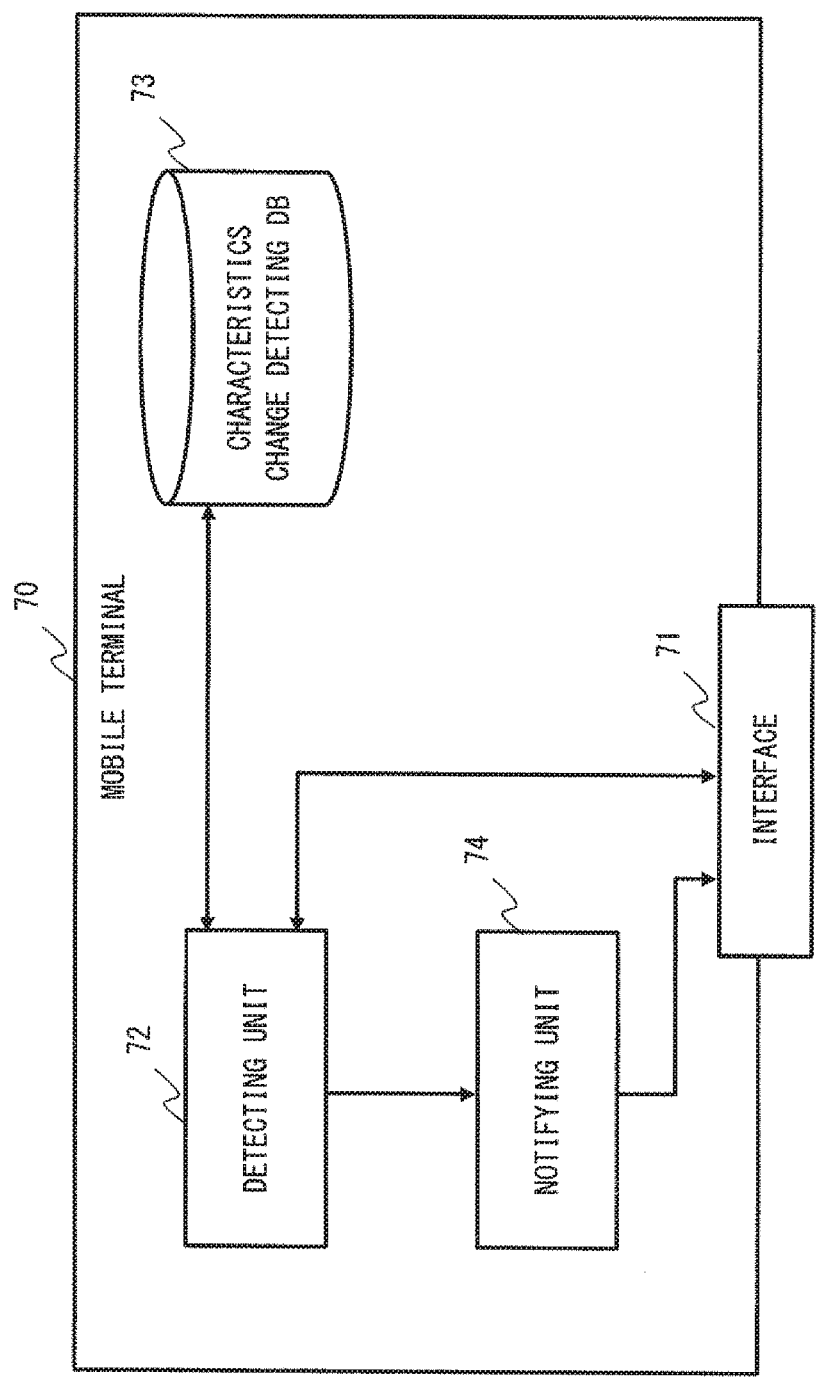
FIG. 17 is a configuration diagram of a mobile terminal according to the fifth embodiment.

Next, a configuration example of the mobile terminal 70 according to the fifth embodiment of the present invention will be described with reference to FIG. 17. The mobile terminal 70 has an interface 71, a detecting unit 72, a characteristics change detecting DB 73 and a notifying unit 74.

The detecting unit 72 detects event information. As described above, the event information may be information of an operation of a user who operates the mobile terminal 70 or sensor information detected by the mobile terminal 70. The detecting unit 72 extracts a characteristics change corresponding to the detected event information using the characteristics change detecting DB 73. A configuration of the characteristics change detecting DB 73 is the same as that in FIG. 3, and therefore will not be described in detail.

When extracting the characteristics change corresponding to the event information detected by the detecting unit 72, the detecting unit 72 outputs the extracted characteristics change to the notifying unit 74.

The notifying unit 74 outputs the characteristics change output from the detecting unit 72, to the control apparatus 30 through the interface 71.

Figure 18:
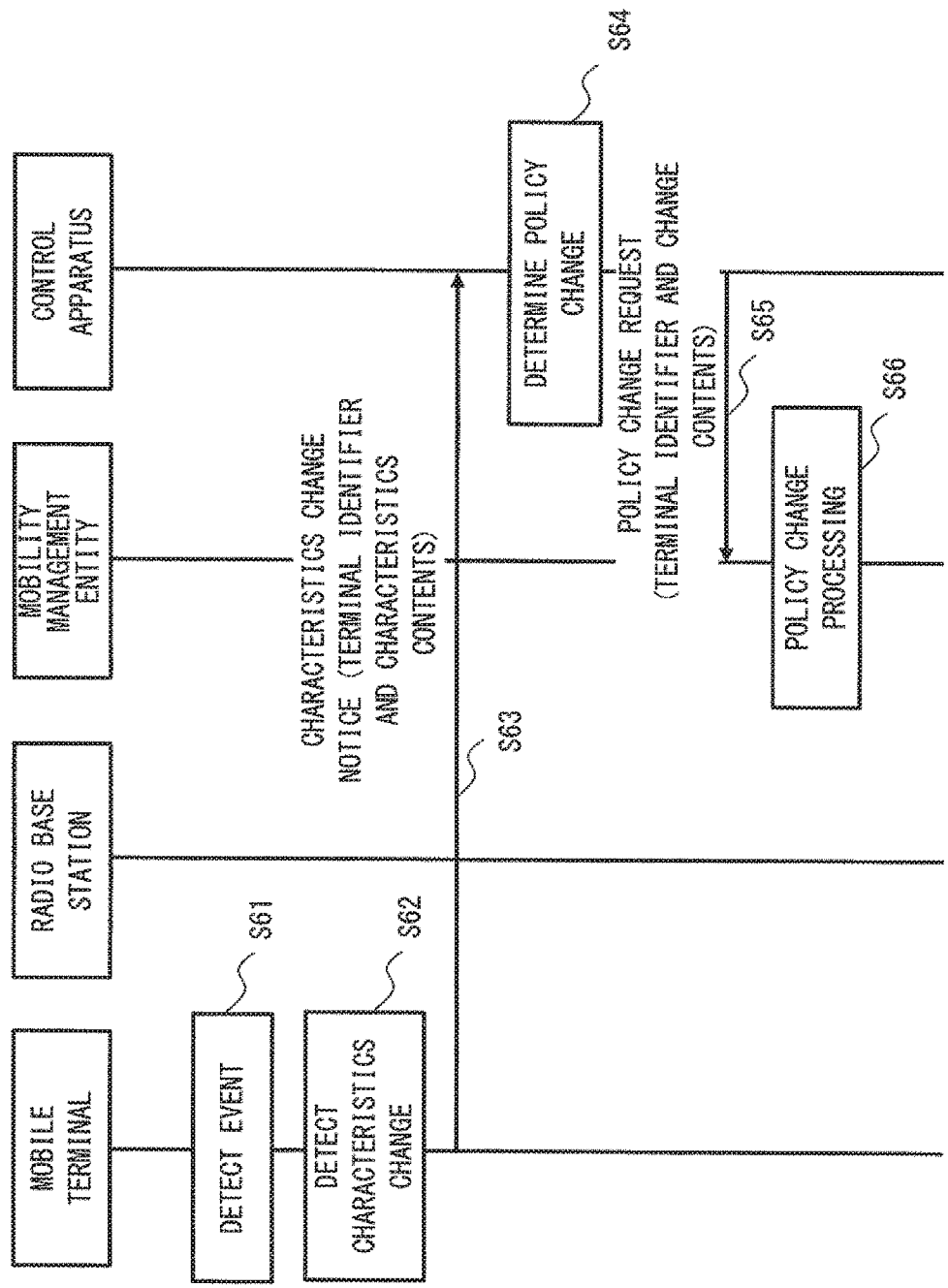
FIG. 18 illustrates a sequence illustrating a flow of processing of setting a NW control policy according to the fifth embodiment.

Next, a flow of processing of setting a NW control policy according to the fifth embodiment of the present invention will be described with reference to FIG. 18. First, the mobile terminal 70 detects event information (S61). Next, the mobile terminal 70 detects a characteristics change corresponding to the detected event contents (S62). Next, the mobile terminal 70 transmits a notification about the detected characteristics change to the control apparatus 30 (63). A terminal identifier of the mobile terminal 70 is also included in a message in which a notification about the characteristics change is transmitted from the mobile terminal 70 to the control apparatus 30.

Step S64 to step S66 are the same as step S24 to stop S26 in FIG. 7, and therefore will not be described in detail.

As described above, the mobile terminal 70 according to the fifth embodiment of the present invention includes a function realized in the detection server. Consequently, it is possible to skip data communication between the mobile terminal 70 and the detection server, and reduce a signal amount of the entire mobile communication system.

Although the present invention has been described as a hardware configuration in the above embodiments, the present invention is not limited to these embodiments. The present invention can also be realized by executing a computer program which causes a CPU (Central Processing Unit) to perform the processing of the detection server and the control apparatus in FIG. 7 and the processing disclosed in FIG. 11.).

In the above example, the program can be supplied to the computer by being stored using various types of non-transitory computer readable media. The non-transitory computer readable media include various types of tangible storage media. The non-transitory computer readable media include, for example, magnetic recording media (e.g. flexible disks, magnetic tapes and hard disk drives), magnetooptical recording media (e.g. magnetooptical disks), CD-ROMs (Read Only Memory), CD-Rs, CD-R/Ws, and semiconductor memories (e.g. mask ROMs, PROMs (Programmable ROM), EPROMs (Erasable PROM), flash ROMs and RAMs (Random Access Memory)). Furthermore, the program may be supplied to the computer using various types of transitory computer readable media. The transitory computer readable media include, for example, electric signals, optical signals and electromagnetic waves. The transitory computer readable media can supply the program to the computer using wired communication channels such as electric wires and optical fibers or wireless communication channels.

In addition, the present invention is not limited to the above embodiments, and can be adequately changed as long as the change does not deviate from the spirit of the invention.

Although the present invention has been described with reference to the embodiments above, the present invention is by no means limited to the above embodiments. Various changes which one of ordinary skill in the art can understand can be applied to the configurations and the details of the present invention within the scope of the invention.

This application claims priority to Japanese Patent Application No. 2012-006345 filed on Jan. 16, 2012, the entire contents of which are incorporated by reference herein.

REFERENCE SIGNS LIST

10 MOBILE TERMINAL
20 PROCESSING NODE
21 RADIO BASE STATION
22 MOBILITY MANAGEMENT ENTITY
30 CONTROL APPARATUS
31 INTERFACE
32 INTERFACE
33 CONTROL UNIT
34 NW CONTROL POLICY DB
35 NOTIFYING UNIT
40 DETECTION SERVER
41 INTERFACE
42 DETECTING UNIT
43 CHARACTERISTICS CHANGE DETECTING DB
44 NOTIFYING UNIT
45 TERMINAL SPECIFIC DETECTION ITEM DB
50 CORE NETWORK
60 MOBILITY MANAGEMENT ENTITY
61 INTERFACE
62 INTERFACE
63 CONTROL UNIT
64 NW CONTROL POLICY DB
65 NOTIFYING UNIT
66 NW CONNECTION PROCESSING CONTROL UNIT
70 MOBILE TERMINAL
71 INTERFACE
72 DETECTING UNIT
73 CHARACTERISTICS CHANGE DETECTING DB
74 NOTIFYING UNIT

The invention claimed is:

1. A server in a mobile communication system, the server comprising:
a memory storing instructions; and
one or more processors configured to execute the instructions to transmit, based on a change of a communication interval of a mobile terminal, a first parameter indicating the changed communication interval.

2. The server according to claim 1,
wherein the server is arranged outside a radio access network.

3. The server according to claim 1,
wherein the first parameter is received by a mobility management node arranged in a core network.

4. The server according to claim 1,
wherein a second parameter is determined by a mobility management node, using the first parameter.

5. The server according to claim 4,
wherein the second parameter relates to a state transition of the mobile terminal.

6. The server according to claim 4,
wherein the second parameter relates to an idle period of the mobile terminal.

7. The server according to claim 4,
wherein the second parameter is transmitted to a radio base station by the mobility management node.

8. The server according to claim 7,
wherein the second parameter is transmitted to a radio base station by the mobility management node during a setup of a connection.

9. The server according to claim 7,
wherein control of the mobile terminal is performed by the radio base station, using the second parameter.

10. A mobile terminal in a mobile communication system, the mobile terminal comprising:
a memory storing instructions; and
one or more processors configured to execute the instructions to communicate with a server, wherein a first parameter is transmitted by the server based on a change of a communication interval of the mobile terminal, the first parameter indicating the changed communication interval.

11. The mobile terminal according to claim 10,
wherein the server is arranged outside a radio access network.

12. The server according to claim 10,
wherein the first parameter is received by a mobility management node arranged in a core network.

13. The mobile terminal according to claim 10,
wherein a second parameter is determined by a mobility management node, using the first parameter.

14. The mobile terminal according to claim 13,
wherein the second parameter relates to a state transition of the mobile terminal.

15. The mobile terminal according to claim 13,
wherein the second parameter relates to an idle period of the mobile terminal.

16. The mobile terminal according to claim 13,
wherein the second parameter is transmitted to a radio base station by the mobility management node.

17. The mobile terminal according to claim 16,
wherein the second parameter is transmitted to a radio base station by the mobility management node during a setup of a connection.

18. The mobile terminal according to claim 16,
wherein the one or more processors are further configured to execute the instructions to be controlled by the radio base station using the second parameter.

19. A radio base station in a mobile communication system, the radio base station comprising:
a memory storing instructions; and
one or more processors configured to execute the instructions to receive a second parameter from a mobility management node,
wherein a first parameter is transmitted by a server based on a change of a communication interval of a mobile terminal, the first parameter indicating the changed communication interval, wherein the second parameter is determined by the mobility management node using the first parameter.

20. The radio base station according to claim 19, wherein the server is arranged outside a radio access network.

21. The radio base station according to claim 19, wherein the second parameter relates to an idle period of the mobile terminal.

22. The radio base station according to claim 19, wherein the first parameter is received by the mobility management node, the mobility management node arranged in a core network.

23. The radio base station according to claim 19, wherein the second parameter relates to a state transition of the mobile terminal.

24. The radio base station according to claim 19, wherein the second parameter relates to an idle period of the mobile terminal.

25. The radio base station according to claim 19, wherein the second parameter is transmitted to a radio base station by the mobility management node during a setup of a connection.

26. The radio base station according to claim 19, wherein the one or more processors are further configured to execute the instructions to perform control of the mobile terminal using the second parameter.

27. A mobility management node in a communication system, the mobility management node comprising:
a memory storing instructions; and
one or more processors configured to execute the instructions to receive a first parameter,
wherein the first parameter is transmitted by a server based on a change of a communication interval of a mobile terminal, and the first parameter indicates the changed communication interval.

28. The mobility management node according to claim 27, wherein the server is arranged outside a radio access network.

29. The mobility management node according to claim 27, wherein the one or more processors are further configured to execute the instructions to determine a second parameter using the first parameter.

30. The mobility management node according to claim 29, wherein the second parameter relates to a state transition of the mobile terminal.

31. The mobility management node according to claim 29, wherein the second parameter relates to an idle period of the mobile terminal.

32. The mobility management node according to claim 29, wherein the one or more processors are further configured to execute the instructions to transmit the second parameter to a radio base station.

33. The mobility management node according to claim 32, wherein the one or more processors are configured to execute the instructions to transmit the second parameter to the radio base station during a setup of a connection.

34. The mobility management node according to claim 32, wherein control of the mobile terminal is performed by the radio base station, using the second parameter.

35. A method of a mobility management node in a communication system, the method comprising:
receiving a first parameter,
wherein the first parameter is transmitted by a server based on a change of a communication interval of a mobile terminal, and the first parameter indicates the changed communication interval.

\* \* \* \* \*